United States Patent [19]
Hartley et al.

[11] Patent Number: 4,939,687
[45] Date of Patent: Jul. 3, 1990

[54] SERIAL-PARALLEL MULTIPLIERS USING SERIAL AS WELL AS PARALLEL ADDITION OF PARTIAL PRODUCTS

[75] Inventors: Richard I. Hartley, Schenectady; Sharbel E. Noujaim, Clifton Park, both of N.Y.

[73] Assignee: General Electric Company, Schenectady, N.Y.

[21] Appl. No.: 265,734

[22] Filed: Nov. 1, 1988

[51] Int. Cl.$^5$ .............................................. G06F 7/52
[52] U.S. Cl. .................................................. 364/757
[58] Field of Search ........................ 364/754, 757–760, 364/768

[56] References Cited

U.S. PATENT DOCUMENTS

| | | | |
|---|---|---|---|
| 3,610,907 | 10/1971 | Taylor | 364/759 |
| 3,959,639 | 5/1976 | Koethmann | 364/760 |
| 4,811,269 | 3/1989 | Hirose et al. | 364/754 |
| 4,839,847 | 6/1989 | Laprade | 364/757 |

OTHER PUBLICATIONS

Chen, I-Ngo and Robert Willoner, "An O(n) Parallel Multiplier with Bit-Sequential Input and Output", *IEEE Transactions on Computers*, vol. c–28, No. 10, Oct. 1979 pp. 721 to 727.

Cheng, Edmund K., and Carver A. Mead, "A Two's Complement Pipeline Multiplier", IEEE International Conference on Acoustics, Speech, and Signal Processing, Conference Record, pp. 647 to 650 (1976).

Denyer, Peter, and David Renshaw, *VLSI Signal Processing, A Bit-Serial Approach*, Addison–Wesley (1985).

Jackson, Leland B., James F. Kaiser and Henry S. McDonald, "An Approach to the Implementation of Digital Filters", *IEEE Transactions on Audio and Electroacoustics*, vol. AU–16, No. 3, Sep. 1968, pp. 413 to 421.

Jain, Rejeev, Francky Catthoor, Jan Vanhoof, Bart J. S. DeLoore, Gert Goossens, Nelson F. Goncalvez, Luc J. M. Claesen, Johan K. J. Van Ginderdeuren, Joos Vandewalle, and Hugo J. De Man, "Custom Design in a VLSI PCM-FDM Transmultiplexer from System Specifications to Circuit Layout Using a Computer-Aided Design System", *IEEE Journal of Solid State Circuits*, vol. SC–21, No. 1, Feb. 1986, pp. 73 to 85.

Jasica, Jeffrey R., Sharbel Noujaim, Richard Hartley, and Michael J. Hartman, "A Bit-Serial Silicon Compiler", *Proceedings of the IEEE International Conference on Computer-Aided Design*, pp. 91 to 93 (1985).

Lyon, R. F. "Two's Complement Pipeline Multipliers", *IEEE Transactions on Communications*, vol COM-12, pp. 418 to 425 (Apr. 1976).

Scanlon, Joseph T., and W. Kent Fuchs, "High Performance Bit-Serial Multiplication", *Proceedings of the IEEE International Conference on Computer Design*, pp. 114 to 117 (1986).

Strader, Noel R., and V. Thomas Rhyne, "A Canonical Bit-Sequential Multiplier", *IEEE Transactions on Computers*, vol. c-31, No. 8, Aug. 1982, pp. 791 to 795.

Yassa, Fathy F., Jeffrey R. Jasica, Richard I. Hartley, and Sharbel E. Noujaim, "A Silicon Compiler for Digital Signal Processing: Methodology, Implementation and Applications", *Proceedings of the IEEE, Special Issue on Hardware and Software for Digital Signal Processing*, (1986).

Rhyne, T. and Strader, N. R., "A Signed Bit-Sequential Multiplier", *IEEE Transactions on Computers*, vol. c–35, No. 10, Oct., 1986, pp. 896-901.

Gnanasekaran, R., "On a Bit-Serial Input and Bit-Serial Output Multiplier", *IEEE Transactions on Computers*, vol. C–32, No. 9, Sep., 1983, pp. 878–880.

Sips, H. J., "Comments on 'An O(n) Parallel Multiplier with Bit-Sequential Input and Output'", *IEEE Transactions on Computers*, vol. C–31, No. 4, Apr., 1982, pp. 325-327.

Primary Examiner—Gary V. Harkcom
Assistant Examiner—Long T. Nguyen
Attorney, Agent, or Firm—Allen L. Limberg; James C. Davis, Jr.; Marvin Snyder

[57] ABSTRACT

A cell module which is particularly employable in bit-serial silicon compilation methods permits the fabrication and layout of bit-serial multipliers having variable word sizes. In particular, the cell module permits the fabrication of a bit-serial multiplier which is capable of a number of different functions including the production of high-order (major) and low-order (minor) output product bit streams which may be selected from so as to provide output results in a variety of different formats associated with binary fractional multiplication.

31 Claims, 7 Drawing Sheets

FIG. 2

| TIME | BITTICK 0 | BITTICK 1 | BITTICK 2 | BITTICK 3 | BITTICK 4 | BITTICK 5 | BITTICK 6 | BITTICK 7 |
|---|---|---|---|---|---|---|---|---|
| CONTROL | 0 | 0 | 0 | 1 | 0 | 0 | 0 | 1 |
| B LATCH | 0110 | 0110 | 0110 | 0110 | dddd | dddd | dddd | dddd |
| BIT (A) | 1 | 0 | 1 | 1 | d | d | d | d |
| B*BIT | 0110 | 0000 | 0110 | 1001* | dddd | dddd | dddd | dddd |
| PSMIN | 0000 | 0011 | 0001 | 0011 | dddd | dddd | dddd | dddd |
| CIN | 0000 | 0000 | 0000 | 0000 | 0000 | dddd | dddd | dddd |
| CARRY | 0000 | 0000 | 0000 | 0001 | dddd | dddd | dddd | dddd |
| SUM | 0110 | 0011 | 0111 | 1010 | dddd | dddd | dddd | dddd |
| PSMOUT | 0011 | 0011 | 0011 | 0111 | 0000 | dddd | dddd | dddd |
| PRODLO | 0 | 1 | 1 | 1 | 0 | d | d | d |
| SUMOUT | bbbb | bbbb | bbbb | 1010 | 1101 | 1110 | 1111 | 0000 |
| CARRYOUT | 0bbb | 00bb | 000b | 0000 | 0001 | 0000 | 0000 | 0000 |
| CIN(MULTXCONT) | b | b | b | (A=)1 | 0 | 1 | 0 | d |
| COUT(MULTXCONT) | b | b | b | 0 | 1 | 0 | 0 | d |
| SUM(MULTXCONT) | b | b | b | 1 | 1 | 1 | 1 | d |
| PRODHI | b | b | b | b | 1 | 1 | 1 | 1 | b = UNKNOWN, PERTAINING TO PREVIOUS CALCULATION
d = UNKNOWN, PERTAINING TO SUCCEEDING CALCULATION

EXAMPLE ABOVE:
$A = -3_{10} = 1101_2$
$B = 6_{10} = 0110_2$
$2A \cdot B = -36 = 11011100_2$

SERIAL-PARALLEL MULTIPLIERS USING SERIAL AS WELL AS PARALLEL ADDITION OF PARTIAL PRODUCTS

The invention relates to serial-parallel multipliers for serial digital signals, such as bit-serial signals.

BACKGROUND OF THE INVENTION

There has been increasing interest over the last few years in the bit-serial approach to digital integrated circuit (IC) design. The major advantages which this approach offers are: the small bit-width required of signal ports to and from the integrated circuit, and the reduced number of computational elements, as compared with parallel computation. The bit-serial approach was advocated by L.B. Jackson, J. F. Kaiser and H. S. McDonald in their article entitled "An Approach to the Implementation of Digital Filters:, *IEEE Transactions on Audio and Electroacoustics*, Vol. AU-16, No. 3, September 1968, pp. 413-421, as offering savings in routing and computational hardware as compared with parallel architecture.

In a bit-serial circuit, data flows from one computational element to another along serial lines. The steady stream of bits is divided into words of a fixed number of bits in length. Arithmetic data values are represented in two's complement format and are passed least significant bit first. Since data flows least significant bit first, the sign bit is the last bit of the word. Separate words of data follow each other directly with no idle bits separating them. Each computational element receives a synchronized control signal (if needed) to indicate to it where one word ends and the next starts. This signal may be synchronized with the most significant bit (sign bit) of each word.

Each operator in a bit-serial circuit has a fixed latency, which is the number of cycles that elapse between the time that the first bits of input signal arrive and the first bit of the output signal response is available. Since each operator may have a different latency, it is usually necessary to insert clocked delays (implemented as shift-registers) into the circuit in order to synchronize the different inputs to an operator. The minimization of the number of delays that need to be inserted is of importance in a bit-serial integrated circuit design. It is desirable to reduce unnecessary digital hardware to make room on the integrated circuit die for more important circuitry or, alternatively, to permit reduced die size so more dies can be cut from each silicon wafer. Eliminating unnecessary circuitry conserves system power requirements and tends to improve system reliability. In the particular case of delay circuits it is usually desired to reduce their number or relocate them so as to reduce the latency involved in arithmetic or logic processes and thereby improve system speed of response.

It has been demonstrated that bit-serial circuitry is particularly suited to automatic chip generation using silicon compilers. See, for example, P. Denyer and D. Renshaw, *VLSI Signal Processing, A Bit-Serial Approach*, Addison-Wesley (1985); J. R. Jasica, S. Noujaim, R.I. Hartley, and M. J. Hartman, "A Bit-Serial Silicon Compiler", *Proceedings of the IEEE International Conference on Computer Aided Design*, p 91-93 (1985); F. F. Yassa, J. R. Jasica, R. I. Hartley, and S. E. Noujaim, "A Silicon Compiler for Digital Signal Processing: Methodology, Implementation and Applications", *Proceedings of the IEEE, Special Issue on Hardware and Software for Digital Signal Processing*, Vol. 75, No. 9, Sept. 1987, pp. 1272-1282; and R. Jain, F. Catthoor, J. Vanhoff, B. J. S. DeLoore, G. Goossens, N. F. Goncalvez, L. J. M. Claesen, J. K. J. Van Ginderdeuren, J. Vandewalle, and H. J. De Man, "Custom Design in a VLSI PCM-FDM Transmultiplexer from System Specifications to Circuit Layout Using a Computer-Aided Design System", *IEEE Journal of Solid State Circuits*, Vol. SC-21, No.1, February 1986, pp. 73-85.

A silicon compiler is generally described as a combination of software and hardware which accepts high-level language instructions from a human and produces chip production masks which are used in the fabrication of electronic circuitry designed to carry out the high level function specified by the human. The silicon compiler stores in its memory information concerning how to design masks for certain standard circuit configurations. For circuit configurations which implement a large number of similar electronic processing steps, which number of steps may vary from design to design, it is most efficient to store information concerning masks for portions of the circuitry denominated "cells", at least some of which cells can be iterated as many times as needed to generate a range of different integrated circuit designs. Accordingly, designs for integrated circuits are sought which are flexible in regard to accepting digital signals of different word size, etc., but can be constructed from basic cells or partial circuits so the masks for making the circuits can be readily generated using a silicon compiler.

There has been particular interest in the bit-serial procedure for performing digital arithmetic tasks. Addition procedures (which may be signed) are readily implemented by bit-serial processing, with reduced hardware requirements as compared to parallel processing. Multiplication procedures for bit-serial operands have been and continue to be a subject of study, because digital multiplication by parallel processing requires a large number of hardware elements. Signed multiplication procedures are especially challenging.

Fully pipelined bit-serial multipliers where multiplication proceeds as both operands are serially received are described by I-N. Chen and R. Willoner in "An O(n) Parallel Multiplier with Bit-Sequential Input and Output". *IEEE Transactions on Computers*, Vol. C-28, No. 10, October 1979, pp. 721-727, and by N. R. Strader and V. T. Rhyne in "A Canonical Bit-Sequential Multiplier", *IEEE Transactions on Computers* Vol. C-31, No. 8, August 1982, pp. 791-795. These multipliers have two significant drawbacks. Firstly, they are not easily extended to two's complement calculation, operating only on unsigned integers. Secondly, they can accept new input data only once every 2n cycles.

The design of the Chen et alii and Strader et alii multipliers was modified as described by J. T. Scanlon and W. K. Fuchs in "High Performance Bit-Serial Multiplication", *Proceedings of the IEEE International Conference on Computer Design*, pp. 114-117 (1986). Scanlon et alii observed that the individual cells in the Chen et alii and Strader et alii arrays are underused, being used on the average only half of the time. An ingenious but somewhat cumbersome bidirectional array of multiplier slices was used by Scanlon et alii, that allows new input data every n+1 cycles. The design is easily further modified to allow new samples every n cycles by the addition of one extra bit slice. A significant drawback of this multiplier, however, is that it does not handle two's complement numbers easily. Furthermore, the external control circuitry required is complex, since control signals and input data must be fed to alternate ends of the multiplier array. Furthermore, the output data of consecutive calculations come from alternate ends of the multiplier array.

R. I. Hartley and P. F. Corbett describe a fully pipelined serial-bit multiplier in their U.S. Pat. No. 4,860,240 issued Aug. 22, 1989, entitled "LOW LATENCY TWO'S COMPLEMENT BIT-SERIAL MULTIPLIER" and assigned to General Electric Company. The Hartley et alii serial-bit multiplier supplies the major product (i.e., the higher order bits of the full product) in a separate bit stream from the minor product (i.e., the lower-order bits of the full product). The major product is supplied immediately following the minor product, which is advantageous in that one can select a product of desired precision on a floating point basis, selecting bits from either or both the major product and minor product bit streams using a time-division multiplexer. Dual-bit carries are used in the partial summation procedures used to generate the major product.

A number of the bit-serial multiplication procedures used prior to the development of fully pipelined bit-serial multipliers are of a type in which each successive word of one of the bit-serial operands is converted to parallel form prior to actual multiplication proceeding. This type of bit-serial multiplier was described by R. F. Lyon, in a concise paper "Two's Complement Pipeline Multipliers", *IEEE Transactions On Communications*, Vol. COM-12, No.4 April 1976, pp. 418-425. The Lyon multiplier will accept new n-bit operand values only every n+1 cycles, which undesirably requires that one idle bit be inserted between each pair of successive operand words.

In the Lyon multiplier and its descendants the bit-serial multiplicand is supplied to a serial-to-parallel converter during the time interval a preceding multiplication is carried out, and the parallel bits of the multiplicand are then latched into a multiplicand, or "icand", register throughout the ensuing time interval that multiplication actually proceeds. The successive bits of the bit-serial multiplier are then multiplied by each bit of the multiplicand in respective successive clock cycles. The partial sum is continuously being revised by serial addition while multiplication progresses.

To accommodate this, the low-order bits of the product (i.e., the minor product) are discarded as they occur in the Lyon multiplier, and only those portions of the partial sums needed for generating the n high-order bits (i.e., the major product) are kept. This procedure does not permit multiplication with a fractional multiplier signal, and it does not permit double-precision multiplication. The Lyon multiplier has the additional drawback that sign bit extension for the multiplicand involves quite complex circuitry.

J. T. Scanlon and W. K. Fuchs describe in their 1986 paper "High Performance Bit-Serial Multiplication", *Proceedings of the IEEE International Conference on Computer Design* pp. 114-117, a modification of the Lyon bit serial multiplier in which the bits of the major product flow through one pipeline, while the bits of minor product are preserved and delivered into another pipeline. This multiplier like Lyons's accepts new operand values only every n+1 cycles, which makes it difficult to apply bit-serial operands directly to the multiplier in a pipelined operation.

Lyon contrasts his multiplication procedure with the prior-art serial-parallel multiplier as modified to a pipeline form. In the serial-parallel multiplier modified to pipeline form, as Lyon describes in regard to FIG. 1 of his concise paper, each successive bit of the serial multiplier signal simultaneously multiplies all bits of the multiplicand as held in parallel in the icand register to form a partial product, which is subsequently parallelly added with appropriate bit shift to the preceding partial sum to generate a new partial sum. Lyon dismisses the serial-parallel multiplier, as not being an attractive method for multiplying an k-bit bit-serial multiplicand and by an n-bit bit-serial multiplicand, because the full product (i.e. both major and minor products) must be generated over n+k or n+k−1 clock cycles. Lyon viewed this as restricting successive operations to begin every $(n+k+1)^{th}$ or $(n+k)^{th}$ clock cycle and making the serial-parallel multiplier unattractive for performing successive multiplications on a pipelined basis.

The inventors disagree with the view that the serial-parallel multiplier is unsatisfactory for performing successive multiplications on a pipelined basis. Successive multiplications of bit-serial numbers each or bit long can be initiated every $n^{th}$ bit interval in pipelined multiplication through the serial-parallel multiplier the inventors find, providing the full products are removed in two bit streams. One bit stream supplies successive minor product terms and the other bit stream supplies successive major product terms, with n bit intervals more latency. Groups of n successive bits can be selected from these bit streams to supply product that has n-bit precision and that has binary point location where desired.

SUMMARY OF THE INVENTION

An aspect of the invention is a method of performing serial-parallel multiplication in electronic apparatus wherein the addition of partial products is carried out by parallel addition to form the minor product and then by subsequent serial addition to form the major product. The parallel addition procedure can be reported at n-bit intervals, as the next n-bit word of multiplier signal becomes available, with serial addition procedure to develop the k-bit-long major product of a preceding multiplication being carried out simultaneously with the parallel addition procedure to develop a portion of the n-bit-long minor product of a succeeding multiplication.

The inventors have in an aspect of the invention further modified the serial-parallel multiplier as modified by Lyon to route the minor product and major product separately from the parallel shift-and-add apparatus used to generate partial sums. This is done so that despite the full product taking (2n−1) or 2n clock cycles to form, it is possible to start a succeeding multiplication every n clock cycles. The bits of the minor product are provided the clock cycle after they are generated by the parallel shift-and-add apparatus, as a part of the shift procedures for the successive partial sums, thereby to generate the minor product in bit-serial sequence. At the time of the last shift, the sum and carry bits associated with the last parallel addition are not all combined on the next cycle, but rather are transferred in parallel into respective shift registers, which operate as respective parallel-to-serial converters, to supply the sum bits in one bitstream and the carry bits serially in another bitstream. These serial bitstreams are supplied to a serial adder which generates as its sum output signal the major product in bit-serial form. The transfer to the shift registers operating as respective parallel-to-serial converters is timed respective to the control signal indicating the end of the multiplier signal word and is followed by immediate clearing of the parallel shift-and-add apparatus so it contains only ZEROs. This clearing and the transferring of the uncombined sum and carry bits of the final summation at the time of the last shift together permit the parallel shift-and-add apparatus to start a succeeding multiplication every $n^{th}$ clock cycle The timing of the major and minor products is such that the full product is supplied in $(2n-1)$ clock cycles, though in two separate bitstreams so that successive products begin to be supplied every n clock cycles; and selection of any desired n-bit sequence of products bits can be made on a time-division multiplex basis to accommodate any locations of binary points in the multiplier and multiplicand signals. Digital hardware requirements are more modest than for fully pipelined bit-serial multipliers in the prior art, in part because bit-by-bit multiplication procedures do not involve multiplications by null bits and in part because the carries supplied to the serial final adder are single-bit rather than dual-bit in nature.

A bit-serial digital multiplier embodying the invention in a preferred monolithic integrated circuit form uses interconnected successively adjoining multiplier slice cells and a control cell adjoining the final multiplier slice cell. This facilitates the masks for making the integrated circuits being generated a silicon compiler. Each multiplier slice cell includes an input latch responding to a control signal switching from a first to second state thereof for storing a next occurring bit of a first of two serial binary operands and means for deriving a multiplicand bit that is the equal of or the complement of that stored bit depending upon whether the control signal is in its first or its second state. Means are provided in each multiplier slice cell for multiplying that multiplicand bit by each successive bit of a second of the serial binary operands during a respective clock interval to generate a respective single-bit product. An adder means is provided in each multiplier slice cell for adding together during each clock interval its own previous carry signal, the currently generated single-bit product and a sum input bit to the multiplier slice cell thereby to generate a current carry bit and a current sum bit. A first unit-delay means stores the current sum bit for one clock interval, thereby to provide a delayed sum bit. A second unit-delay means stores a single-bit input signal supplied to the bit slice (either from another multiplier slice cell or from a ZERO source) for one clock interval to generate a delayed sum input signal. Means are included in the multiplier slice cell for selecting either the delayed sum input signal or the current sum bit as a sum output signal for the cell.

A third unit delay means stores a single bit for one clock interval to generate a carry output signal for the cell, and means are provided for selecting as that single bit either a carry input signal to the cell or the current carry bit as an output carry bit for the cell. The means for selecting respond to said control signal to select the delayed sum input signal and carry input signal as sum output signal and carry output signal respectively during clock intervals said control signal is in its first state. The means for selecting respond to said control signal to select the current sum bit and current carry bit respectively during clock intervals said control signal is in its second state.

In a particularly advantageous embodiment of this aspect of the invention, a switch cell adjoins the control cell and selects appropriate output bits from the high- and low-order output bit streams, in accordance with the number of fractional bits f in the data words of bit length n including sign bit.

BRIEF DESCRIPTION OF THE FIGURES

FIG. 2 is a table illustrating the operation of the serial-parallel multiplier shown in FIG. 1;

DETAILED DESCRIPTION OF THE INVENTION

Figure 1:
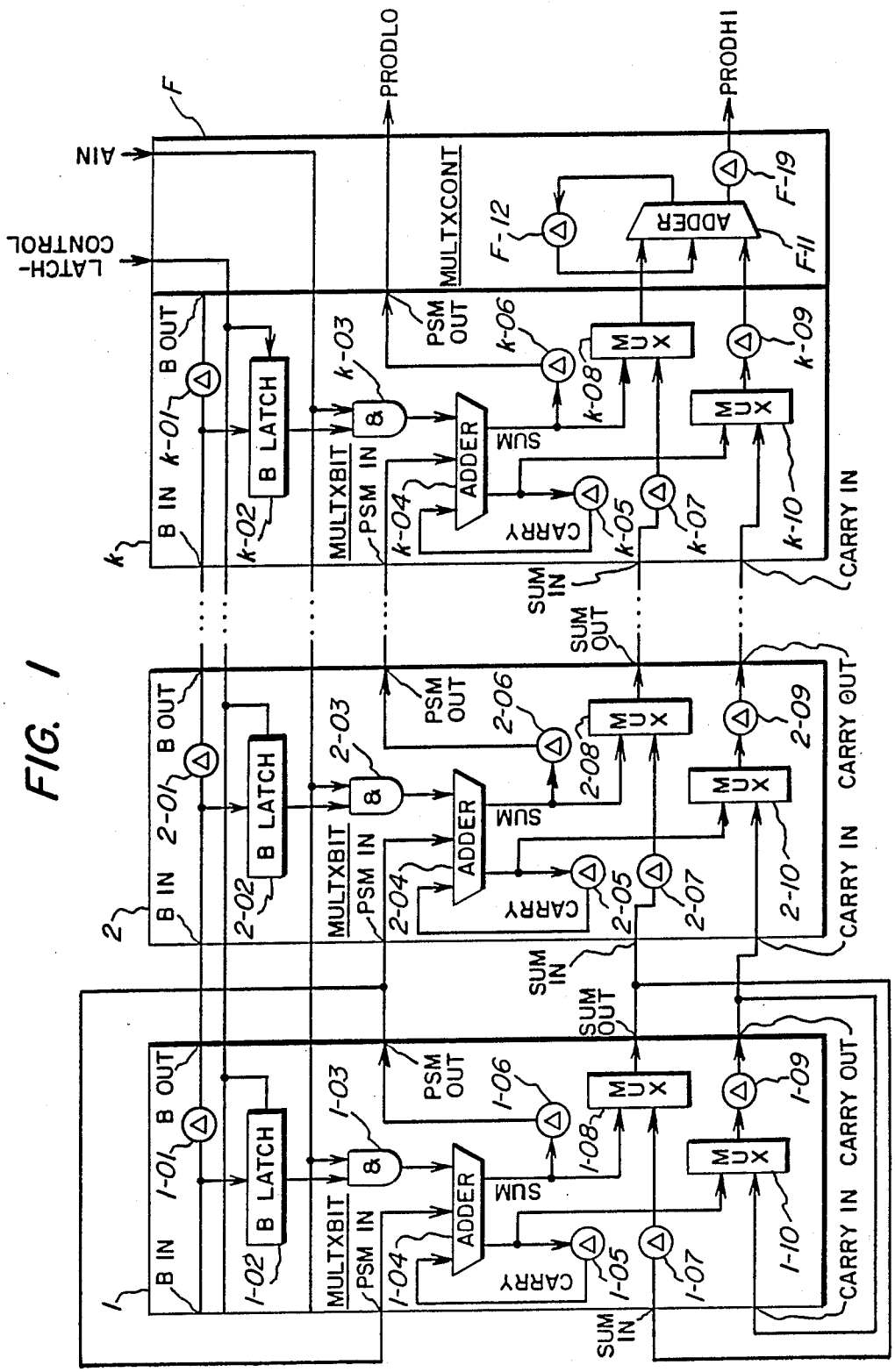
FIG. 1 is a block diagram of a serial parallel digital multiplier embodying the invention.

FIG. 1 illustrates, in schematic diagram form, not only the overall schema of a serial-parallel digital multiplier embodying the invention, but also less detailed schematic circuit configurations for the silicon compiler library cells that are particularly useful in constructing different width bit-serial multipliers. A switch cell as described further on in this specification may be cascaded after the FIG. 1 serial-parallel multiplier to facilitate multiplication in any of a number of different digital data formats. A number of different (n,f) data formats of the product, having n-bit words with f fractional bits, are possible. Signed multiplications may be done by using bit-serial operands that exploit the two's complement number system.

Figure 3:
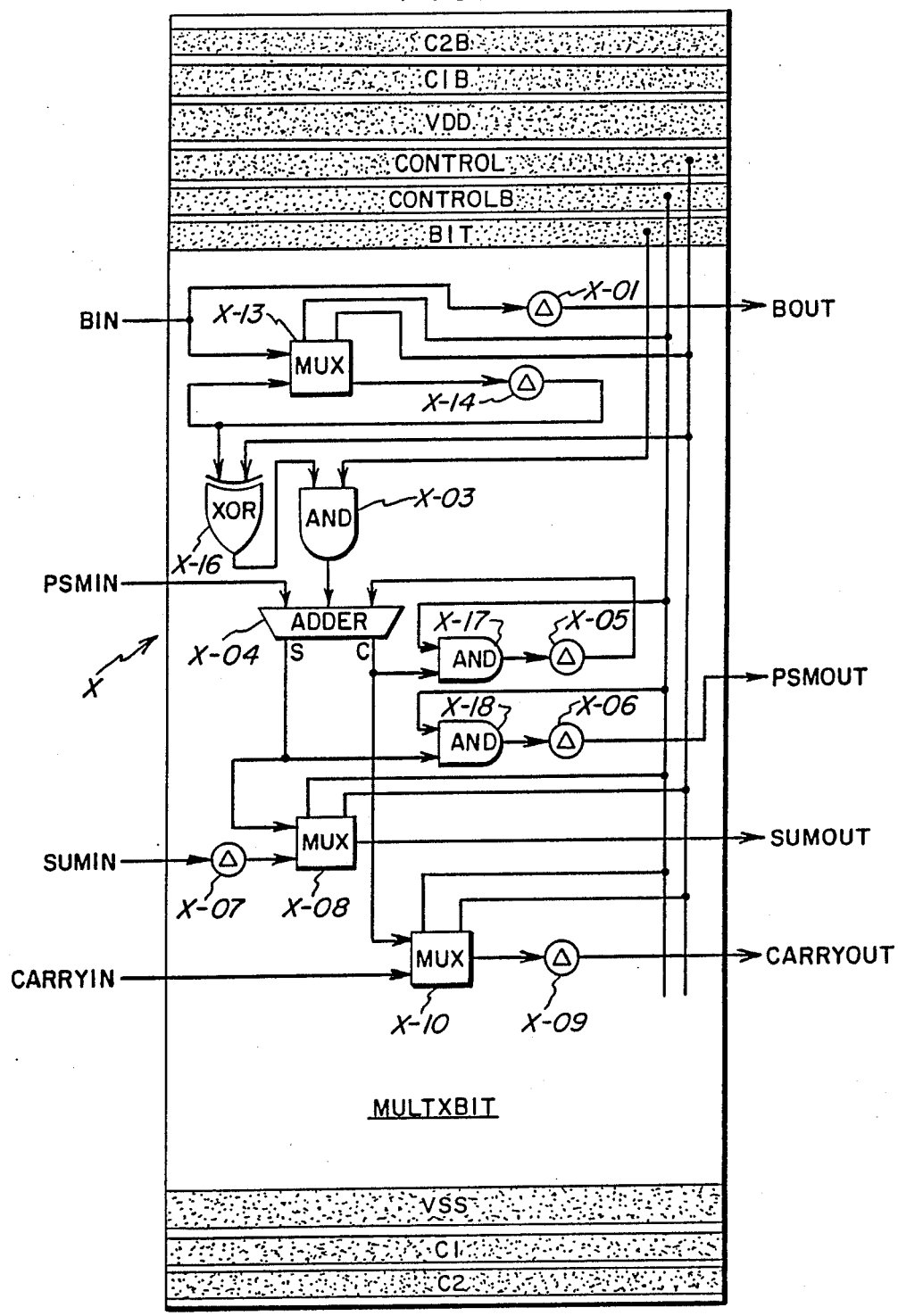
FIG. 3 is a partially schematic diagram illustrating the construction of a multiplier slice cell for a serial-parallel multiplier in accordance with an aspect of the invention.
Figure 4:
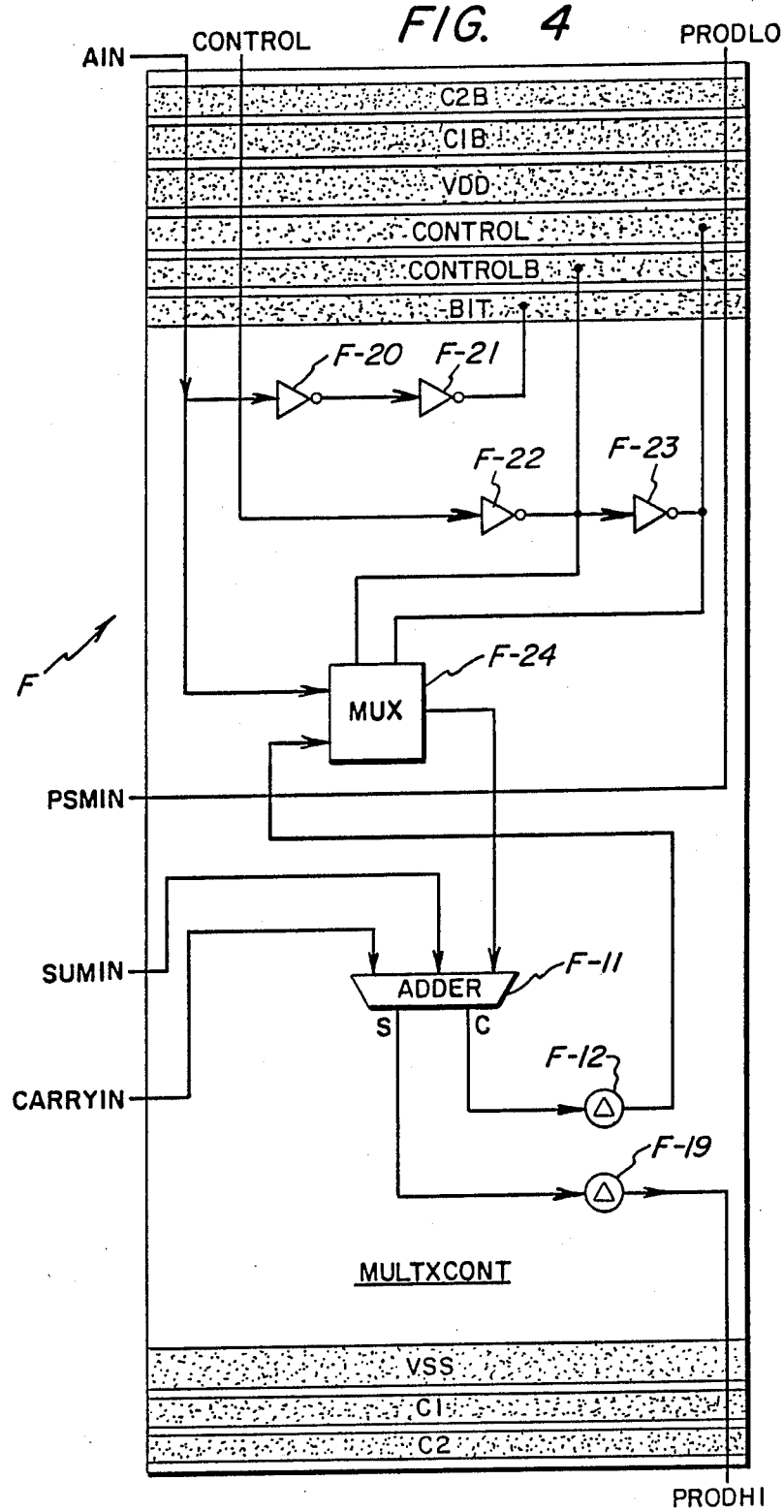
FIG. 4 is a partially schematic diagram illustrating the construction of a control cell for use with the multiplier slice cells per FIG. 3 to form serial-parallel multipliers in accordance with an aspect of the invention.

FIG. 1 shows two distinct kinds of silicon compiler library cells which are useful for constructing multipliers in accordance with an aspect of the invention. In particular, a silicon compiler can successively select a number k of multiplier slice cells 1, 2, ... k of the type referred to herein as MULTXBIT proceeding from left to right across the integrated circuit chip and proceeding progressively less significant bits. Furthermore, at the rightmost end of the multiplier, the silicon compiler places a control cell F, referred to herein as MULTXCONT. The cells 1 through k and F shown in FIG. 1 are configured to abut one another proceeding from left to right, thus facilitating the cell placement operation and wire routing performed by the silicon compiler. It is noted, though, that circuits could also easily be laid out with a main signal flow path that runs from right to left, many silicon compilers having the capability to pervert or invert a cell layout as well as to translate its position or rotate its position in 90° increments. Detailed circuit diagrams and further control line identification for MULTXBIT and MULTXCONT are shown in FIGS. 3 and 4 respectively.

Elements within the multiplier slice cells 1, 2, ... k are given identification numbers having a prefix, a suffix, and an intervening hyphen. The prefix is the number of the multiplier slice cell, and the suffix characterizes the nature of the element itself within any one of these cells. Where elements in all multiplier slice cells are referred to generally, the prefix x followed by the suffix identifying the particular elements in each cell will be used, it being understood x takes on all values 1, 2, ... k. Similar elements in different multiplier slice cells are identified by numbers with similar suffixes and different prefixes. The representative multiplier slice cell shown in FIG. 3 will also carry the identification number x. Consider k to equal n until later on in the specification, where the possibilities with regard to making k less than n in order to conserve digital hardware will be considered.

Clocked unit-delay elements that delay a bit one clock interval in time are shown schematically as circled triangles in the figures. (These delay elements may be clocked data flip-flops or type D flip-flops. From an overall function point of view, clocked unit-delay elements 1-01, 2-01, ... k-01 and B latches 1-02, 2-02, ... k-02 within the cells 1, 2, ... k shown in FIG. 1 effectively implement a serial-to-parallel converter for a bit-serial multiplicand signal B. A bit-serial multiplier signal A is also supplied serially after the parallely supplied multiplicand B is latched for the duration of multiplier word in B latches 1-02, 2-02, ... k-02, which together comprises the icand register. (The term "multiplier A" herein refers to factor data for multiplication and not to hardware.)

FIG. 1 shows each multiplier slice cell x=1, 2, ... k including a respective AND gate x-03 to multiply two bits together. This is followed by a respective adder x-04 together with appropriate clocked unit-delay elements, and multiplexer units and connections enabling these adders x-04 together to perform iterative add and shift operations in parallel arithmetic, so as to carry out partial sum accumulation up to the point of generating the final sum without completing its generation by combining sums and carries. Furthermore, each multiplier slice cell x=1, 2, ... k is provided with single-bit clocked unit-delay elements x-07, x-09 and multiplexers x-08, x-10 that are connected as shown in FIG. 1 so as to function as shift registers that are side-loaded with these uncombined sum and carry bits. The sideloading of these shift registers is followed by a clearing of ONEs (by circuitry not shown in FIG. 1) from the adders x-04 and their feedback connections, so an ensuing multiplication can immediately proceed. These shift registers are, after their being side-loaded, operated as a parallel-to-serial conversion means to generate SUMOUT and CARRYOUT serial output data streams from the side-loaded sum and carry bits. These SUMOUT and CARRYOUT output data bitstreams are serially added by a serial adder comprising adder F-11 and carry recycling clocked delay latch F-12 in MULTXCONT cell F. This generates the major product, or high-order bits of the multiplication result labeled PRODHI in FIG. 1.

In the FIG. 1 multiplier apparatus the two bit-serial operands, A and B, are provided in order of increasing significance along signal lines labeled BIN and AIN, respectively. Operand B is considered to be the multiplicand, and operand A is considered to be the multiplier. The bits of operand B enter the serial-parallel multiplier at the left and are moved by shift-register action through the successive x-01 clocked unit-delay elements. After a selected succession of k bits at the n-bit operand B have been shifted to desired position in the array of bit slice cells 1, 2, ... k, that succession of k bits of operand B are latched, one bit per cell in the B latches x-02 that together form the icand register. The A operand is timed to arrive at MULTXCONT cell F beginning with the following clock cycle, and the control signal that indicates the most significant bit of the A operand is used as the basis for controlling the timing of latching B latches x-02. The bits of A are then simultaneously supplied to all of the cells 1 through k and are ANDed bit by bit with all of the bits of operand B to provide a summand. The AND operation is implemented by AND gates x-03. The respective bits of this summand are then supplied to x-04 adders. Each of these x-04 adders can be described as a (3,2) adder, meaning that it accepts three input bits and produces two output bits' namely, a sum output bit signal and a carry output bit signal. The x-04 adders are made to operate as an accumulator. Accumulator action obtains, partly as a result of a shift-and-add operation to be described in more detail in the following paragraph, and partly as a result of feeding back into each of the x-04 adders the carry output it generated a clock cycle before. This delayed feedback function is carried out by respective single-bit clocked unit-delay elements x-05.

Assume at this stage of description that bit-serial multiplier A is positive, so its final bit is a ZERO. Then, the output signal from the set of x-03 AND gates is a partial product that if the bit on the AIN line is a ZERO is a word of all ZEROS, and that if the bit on the AIN line is a ONE is a word equal to the contents of the set of x-02 B latches. This partial product is then passed to the set of x-04 adders in each bit slice. These x-04 adders act as respective bit slices of an accumulator, as described above, to generate successive partial sums. These partial sums are supplied in the form of a sum bit and a carry bit for each bit slice. In adders x-04 respective bits of the current partial product are added to the previous partial sum as shifted one bit place towards greater significance. This shifting of the previous partial sum is done by clocked unit-delay elements 1-06, 2-06, ... k-06.

All of these clocked unit-delay elements 1-06, 2-06, ... k-06 except the last k-06 delay the sum bit output of the corresponding adder 1-04, 2-04, ... k-04 respectively one clock cycle before applying it to the next adder having a prefix one higher in its reference numeral. Clocked unit-delay element k-06 shifts out the least significant bit of the shifted previous partial sum as the next successive bit of the minor product on the line labelled PRODLO. This least significant bit is the sum bit from adder k-04. This can be done because each such bit will not be augmented in any way by the current partial product or any later partial product. The line labelled PRODLO transports only a leading ZERO and the ensuing (n−1) bits of minor product in order of increasing significance and never transports any bit of the major product.

When multiplication of bit-serial numbers is being done, in the generation of partial product from the final bit of operand A, the new summand must be subtracted, rather than added because in a two's complement notation, the weight of the high order bit of an operand is −1. This subtraction is done by complementation of the multiplicand and an attendant later correction in the MULTXCONT cell F as suggested by J. F. Robertson in his correspondence "Two's Complement Multiplication in Binary Parallel Digital Computers", IRE Transactions-Electronic Computers, VREC-4, Sept. 1985, pp. 118-119. For purposes of focusing attention on overall operational data flow, details of this correction are omitted from FIG. 1. However, it is noted that this correction, where required, is accomplished by means of multiplexer F-24 in the MULTXCONT control cell F shown in FIG. 4, as considered more particularly in the detailed description of FIG. 4 later on in this specification. The complementation of the multiplicand is performed by XOR gates x-16 as shown in FIG. 3, which gates are also omitted from FIG. 1.

The shift-and-add procedures carried out by adders x-04 and their associated circuitry would generate (k+2) bit partial sums, if the shifting left and addition of carries were completed. The shifting out of the least significant bit, the sum bit from adder k-04, through PRODLO continually truncates the running partial sum by one bit so only (k+1) bit resolution of the partial sum is carried forward to the next step of accumulation.

In the serial-parallel multiplier of the invention, however, when the final accumulation has been accomplished to the point where carries have yet to be combined, the sum and carry parts of the result are immediately transferred independently to respective shift registers, being differentially delayed by one bit interval to reflect their different weights. This permits the accumulator built around the parallel adder comprising component adders 1-04, 2-04, ... k-04 to be cleared every n clock intervals, rather than every (n+1) clock intervals. The sum and carry bits in these shift registers are then shifted out in subsequent clock cycles to the final adder in MULTXCONT cell F in respective parallel-to-serial conversion procedures.

This final adder is a serial adder comprising an adder F-11 and a clocked delay latch F-12 for carry bits from adder F-11. The final adder is followed by a clocked unitdelay element F-19, used for adjusting the differential delay between the major and minor products so they are sequential in time.

The sum shift register comprises single-bit clocked unit-delay elements 1-07, 2-07, ... k-07 selectively connected in series by multiplexers 1-08, 2-08, ... k-08. The carry shift register comprises single-bit clocked unit-delay elements 1-09, 2-09, ... k-09 selectively connected in series by multiplexers 1-10, 2-10, ... k-10. Signals from these shift registers are supplied to adder F-11 to produce the high order product results, PRODHI. Multiplexers 1-08, 2-08, ... k-08 and 1-10, 2-10, ... k-10 select the sum and carry bits from the last partial summation to the respective clocked unit-delay elements following these multiplexers. Otherwise, they select to connect the delay elements 1-07, 2-07, ... k-07 as the sum shift register and to connect the delay elements 1-09, 2-09, ... k-09 as the carry shift register.

As R. F. Lyon points out, in regard to the summation with one-bit displacement of a current partial product to a just previous partial sum in his bit-serial multiplier, the addition of numbers proceeds correctly in two's complement arithmetic only if the sign bits of both numbers extend equally to the left. In the FIG. 1 serial-parallel multiplier the multiplier slice cell 1 is provided with feedback connections from PSMOUT to PSMIN, from SUMOUT to SUMIN, and from CARRYOUT to CARRYIN. These connections are particularly important when the multiplicand or multiplier is a negative two's complement number. These feedback connections provide, with minimal digital hardware, the sign bit extensions to left necessary for the summation of two's complement partial products to proceed correctly particularly in the case of multiplication with a multiplicand B of shorter bit length than the multiplier A. These feedback connections are in effect discontinued during the clock interval when sign bit appears in the multiplier A, so that one multiplication will not interfere with the succeeding one. The particulars of how this is done will be disclosed further on in the application.

To more fully appreciate the operation of the multiplier shown in FIG. 1, attention is now specifically directed to FIG. 2. FIG. 2 illustrates the signal values present on various indicated signal lines during various stages of a multiplication operation. In particular the table in FIG. 2 illustrates multiplication of operand B, a four-bit two's complement multiplicand, by the operator A, a four-bit bit-serial multiplier. In this particular case, $A = -3$ and $B = +6$ in decimal form. In two's complement binary form, $A = 1101$ and $B = 0110$. The bit values associated with the multiplication of current operands A and B are shown in ONE and ZERO terms in the table of FIG. 2. Bit values associated with a multiplication before the current ONE are indicated by b's and bit values associated with a multiplication after the current line are indicated by d's. The resultant product A.B produced by the circuit shown in FIG. 1 appears in two separate bit streams, one furnished on a PRODLO line and the other furnished on a PRODHI line. The minor product appears least significant bit first on the PRODLO line in successive zeroeth through third clock intervals, BITTICK0, BITTICK1, BITTICK2, BITTICK3 on the PRODLO line. The major product appears least significant bit first on the PRODHI line in successive fourth through seventh clock intervals, BITTICK4, BITTICK5, BITTICK6 and BITTICK7. The sign bit appears on PRODHI line in the seventh clock interval BITTICK7. That is, in reading Table 2, the output should be read from right to left and should include the four rightmost bits of PRODHI and the four leftmost bits of PRODLO. The result A.B is 1101 1100. However, in fact, this result is indicative of twice the value of the actual result because of the presence of the ZERO least significant bit in PRODLO during the first clock interval, BITTICK0. Usually, this first bit out of the multiplier is suppressed, thus properly producing the 2n−1 output bits in a full precision multiplication. However, if for any reason it is desired to double the product of a result, this is accomplished simply by not suppressing this bit.

Several other features of FIG. 2 are also worthy of note. In particular, note that during the four multiplication cycles corresponding to the four bits in operand A, B LATCH signal is held constant. B*BIT signal is the output signal from the AND gates x-03, which one should note from the FIG. 2 table supplies three types of signals at various times. B*BIT may be all zeros; B*BIT may be the same as the contents of the B latch 1-01, 2-01, 3-01, 4-01; or B*BIT may be the one's complement of the contents of the B latch 1-01, 2-01, 3-01, 4-01. Note that the signal on the line labeled BIT comprises the successive individual bits in operand A, least significant bit first. In each column, there are four bit values shown corresponding to the correspondingly labeled signal lines associated with the four MULTXBIT slices 1, 2, 3, 4. Transfers of data between normal signal paths, which take place during BITTICK3, are indicated by arrows in the diagram. Note that in FIG. 2 the rightmost bit position for the quadruple variable labeled PSUMOUT is enclosed in a box that has an arrow thereunder to indicate that this bit, which represents the least significant bit of a partial sum, is transferred to the PRODLO signal line and during BITTICK 3. An asterisk (*) shown on the line labeled B*BIT during BITTICK3 indicates that special processing considerations are employed during this final partial multiplication step. In particular, when it is desired to employ two's complement number arithmetic, it is necessary to one's complement the resulting B*BIT product. As indicated above, this compensates for the fact that the weight of the high order bit of operand A is $-1$. As a result, a subtraction is performed by complementation and a later correction is performed in the MULTXCONT cell. This correction is carried out through the operation of MUX unit F-24 shown in FIG. 4, as discussed further on.

During BITTICK3 multiplexers 1-10, 2-10, 3-10 and 4-10 transfer carry bits from the adders 1-04, 2-04, 3-04 and 4-04 to clocked delay latches 1-09, 2-09, 3-09 and 4-09 respectively in the CARRYOUT shift register to final adder F-11 in the MULTXCONT cell F. The multiplexers 1-08, 2-08 and 3-08 transfer sum bits from adders 1-04, 2-04 and 3-04, respectively to the clocked delay latches 2-07, 3-07 and 4-07 in the SUMOUT SHIFT REGISTER, respectively; and multiplexer 4-08 transfers a sum bit from adder 4-04 to final adder F-11.

Attention is now directed to FIG. 3 which depicts MULTXBIT multiplier slice x, where x can assume any integral value one to k. The circuit shown in FIG. 3 is primarily schematic, but does include certain desirable physical layout features shown in stipple. In particular, it is seen that source and drain power supply voltage lines VSS and VDD, respectively, are shown extending across the bottom and top of the multiplier slice layout. These lines supply power to the circuits shown schematically therein. Furthermore, there are also shown clock lines C1 and C2 extending across the bottommost portion of the bit slice layout. Corresponding complemented clock lines extend across the top of the multiplier slice layout and are designated C1B and C2B. The "B" designation is employed herein to indicate that C1B and C2B are complemented or "barred" versions of C1 and C2, respectively. It is also seen that control lines CONTROL and its complemented version CONTROLB are also present. CONTROL and CONTROLB extend across the multiplier slice layout immediately below the drain voltage supply line VDD. However, it is noted that the particular vertical stacking order of the stippled lines shown in FIG. 3 is not critical. Any convenient layout pattern for these lines may be employed. However, it is important for layout efficiency that consistency of the placement of these lines exist across the cells MULTXBIT and MULTXCONT. Lastly, among the stippled lines extending across the multiplier slices, one finds the line labeled BIT. This line, in particular, carries the serially supplied operand A multiplier. It is seen that signals on this line are fed directly to AND gates x-03.

Consider now the circuitry shown schematically in FIG. 3. It is noted at the outset that many of the circuits shown in MULTXBIT x in FIG. 4 are similarly labeled in FIG. 1 with x taking the successive integral values one through k. FIG. 3, however, represents a more complete description of a preferred embodiment of the invention. The new values of the operand B are shifted into the serial-parallel multiplier using a shift register comprising a cascade connection of clocked delay latches x-01. At the proper time as determined by the CONTROL and CONTROLB signals, each bit of a current value of the operand B is gated into a respective ONE of the B latches.

B latch x-02 shown in block in FIG. 1 is replaced in FIG. 3 by a preferred embodiment of B latch comprising a MUX (multiplexer) x-13 and a single-bit clocked unit-delay-element x-14. During normal multiplication, which occurs as operand A is supplied serially on the BIT line, the output of MUX x-13 is fed back to an input port of MUX x-13 via the clocked unit-delay element x-14, thereby to form the desired B latch. By taking the B latch output signals from the output ports of the clocked unit-delay elements x-14 rather than their input ports, the CONTROL and CONTROLB lines which are pulsed to ONE and to ZERO respectively during the sign bit interval can be used to establish the B latch contents during the first bit interval of the next multiplier A word received on the BIT line. Accordingly, MUX x-13 is controlled by the CONTROL and CONTROLB lines. Since these are complemented input control variables, MUX x-13 operates either to recycle the value of operand B (as during normal multiplication) or operates to supply values of a new operand B to the latch comprising elements x-13 and x-14.

As indicated above, when two's complement multiplication is employed and the last bit of operand A is being multiplied, some adjustments are made. In particular, it is noted that in this particular case, the bit of operand A that is acting as a multiplier is in fact the sign bit and as such, carries a weight of $-1$ as discussed above. The partial product formed by the sign bit must take into consideration the negative polarity of this weight. Accordingly, a respective EXCLUSIVE-OR (XOR) gate x-16 is provided in each MULTXBIT x to accomplish this function. In accordance with signals present on the CONTROL line (as supplied to XOR gate x-16), the output of the B latch from unit-delay element x-14 is complemented prior to being supplied to AND gate x-03. At all other times, the uncomplemented form of the B latch content from clocked unit-delay element x-14 is supplied to AND gate x-03 in the MULTXBIT slice.

The signal output from AND gate x-03 is supplied to adder x-04, which also receives a delayed carry output signal through clocked unit-delay element x-05 in response to control signals supplied to an AND gate x-17. In general, this delayed and added carry represents the carry output from the previous partial sum. Adder x-04 also receives a signal PSMIN from the multiplier-slice circuitry laid out on its left. This represents the previous sum bit. Thus, in general, during ordinary multiplication operations, adder x-04 receives three signals respectively representing the current partial product bit, the previous partial sum bit from the next-higher-order bit position and the carry bit signal recirculated around the adder. It is these three signals that are needed to produce the current partial sum after the one-bit-shift left associated with expulsion of the least significant bit of the previous partial sum as a successive bit of PRODLD. Accordingly, these three single-bit signals are added together, using for example, a conventional full adder circuit, to produce an output sum and an output carry labeled respectively S and C in FIG. 3.

The carry output C from adder x-04 is fed back through clocked unit-delay element x-05 as an input signal to the same adder, as indicated in the description of FIG. 1. An AND gate x-17 permits this to be conditionally done during all bits of the multiplier A word except the last, in response to signals present on the CONTROL line. The carry output C from adder x-04 is also supplied to MUX x-10 as discussed below.

The sum output of adder x-04 also is supplied to a MUX unit, namely multiplexer x-08, as shown. The output sum S from adder x-04 is also supplied to AND gate x-18 which is also responsive to the CONTROL signal line. The output of AND gate x-18 is supplied to clocked delay latch x-06 to provide the output signal line PSMOUT (partial sum output) from the MULTX-BIT multiplier slice layout shown. The PSMOUT line is supplied to the next multiplier slice in which it is seen to comprise the PSMIN signal line. The layout shown in FIG. 3, then, provides natural data flows from multiplier slice to multiplier slice. Note that the PSMOUT signal line in the rightmost MULTXBIT bit slice k is in fact the PRODLO signal line, as seen in FIG. 1. Note, too, particularly as a result of the presence of single-bit clocked unit-delay element k-06, the first bit out in PRODLO is customarily disregarded, as explained above.

During the last bit of the multiplier A word, a ZERO appears on CONTROLB bus causing the output signals of AND gates x-17 and x-18 to go to ZERO. This clears ONEs from appearing in the partial sum accumulator during the initial bit of the next multiplier A word and avoids interference of one multiplication with the next. Also during the last bit of the multiplier A word sum and carry components of the partial summations are transferred from adders x-04 to respective shift registers through appropriate operation of multiplexers x-08 and x-10. This pair of shift registers are subsequently used during the following clock cycles to transport the as yet unaccumulated sum and carry signals from adders x-03 to the final adder F-11 in a serial addition procedure. These procedures facilitate the immediate loading of a new multiplicand into the shift register formed from clocked unit-delay elements 1-01, 2-01, . . . k-01 and commencement of the parallel generation and parallel accumulation of partial products for the next multiplication procedure.

During the multiplier A sign bit interval CONTROL and CONTROLB lines are at ONE and ZERO levels respectively to condition multiplexer x-08 on each MULTXBIT multiplier slice cell x to select a sum bit from the final summation, which sum bit appears at the sum outputs of its adder x-04, to the SUMOUT line from the cell. This SUMOUT line connects, except in the case of the final MULTXBIT cell k, to the SUMIN line of a succeeding MULTXBIT cell and thence to the clocked unit-delay element x-07 of that succeeding MULTXBIT cell. The SUMOUT line of the final MULTXBIT cell k connects to the SUMIN line of the MULTXCONT cell F and to adder F-11 therein. After the sign bit of the multiplier A, CONTROL and CONTROLB lines return to their customary ZERO and ONE levels, respectively. Multiplexers x-08 restore the cascade connection of clocked unit-delay elements x-07 as a shift register serially supplying the successive SUMOUT bits to serial final adder F-11 in MULTXCONT control cell F via its SUMIN port.

During the multiplier A sign bit interval multiplexer x-10 in each MULTXBIT cell x is conditioned by ONE and ZERO appearing on CONTROL and CONTROLB lines respectively to select a carry bit from the final summation, which carry bit appears at the C output of its adder x-04 to the input port of its clocked unit-delay element x-09 After the sign bit of multiplier A, multiplexers x-10 are conditioned by ZERO and ONE appearing on CONTROL and CONTROLB lines respectively to restore a cascade connection of clocked unit-delay elements x-09 as a shift register serially supplying successive CARRYOUT bits to the serial final adder F-11 in MULTXCONT control cell F via its CARRYIN port. Clocked unit-delay elements x-09 differentially delays the CARRYOUT bits respective to the SUMOUT bits supplied to final adder F-11 in MULTXCONT control cell F in accordance with the relative 2:1 weighting of carry and sum bits from the C and S output ports of each adder x-04.

FIG. 4 shows that adder F-11 has associated therewith clocked unit-delay element F-12 which feeds carry signals from the output of adder F-11 back as input to this adder. The combination of adder F-11 and delay element F-12 operates as a serial adder which generates the major product as the running sum of the residual sum and carry digits. This major product is supplied through clocked unit-delay element F-19 to the PRODHI line.

Now consider other components of the MULTXCONT control cell F as shown in FIG. 4. A pair of inverters F-20 and F-21 are preferably used to provide a reinforced BIT signal from the AIN input signal line which represents the serial input of operand A, least significant bit first. Logic inverters F-22 and F-23 act as drivers for the CONTROL B and CONTROL busses supplying the MULTXBIT slices 1, 2, . . . k. Multiplexer F-24 receives both the true and complemented forms of the CONTROL signal from logic inverters F-23 and F-22 as well.

Multiplexer F-24 plays an important role during multiplication of two's complement binary format numbers. In particular, it is necessary to add a one-bit correction at the end of the multiplication operations depending upon the sign of operand A. Thus, for most of the time, MUX F-24 operates to recirculate the previous carry output from adder F-11 through clocked unit-delay element F-12 back as an input to adder F-11. However, in response to signals on the CONTROL line, and particularly as generated through inverters F-22 and F-23, MUX unit F-24 selects the sign bit of operand A to adder F-11 after the last multiplication operation occurs between operands A and B. That is, when the minor product has been completely provided from PRODLO and when the final addition processes to form the major product will commence on the subsequent clock cycle.

The operation of the serial-parallel multiplier described herein may be restricted to the situation in which a complete multiplication operation between an n-bit multiplier signal and k selected bits of an n-bit multiplicand signal is carried out and all of the $(2n-1)$ output bits are generated and assumed to be passed on to subsequent processing stages. However, the operation of the multiplier is readily adapted to generate products in a variety of different data formats. In the serial-parallel multiplier as shown in FIG. 1 the lower-order part of the product, the minor product, is available on the output line PRODLO. This low-order part of the product finishes being clocked out the clock cycle immediately preceding that in which the clocking out of the high-order part of the product, or major product, begins on the output line PRODHI. That is, minor products and their associated major products are staggered in time by n clock cycles, the major products appearing n cycles later than their associated minor products. Thus, the 2n bits of the full product (actually 2n−1 significant bits plus a usually extraneous low-order initial ZERO when two's complement numbers are used) come out of the multiplier in sequence, though on two different signal lines, PRODLO and PRODHI. Therefore, an arbitrary n-bit field from the product can be extracted by simply switching on a time-division-multiplexing basis between the less and more significant bit streams.

If two unsigned n-bit words are multiplied, the result is a word that is, 2n bits long. If the high-order bit in each of two n-bit words represents a sign bit, as it typically does in "two's complement" data representation, then the product of two numbers in this format possesses (2n−1) bits, if maximum accuracy is maintained because the product needs to have only one sign bit. The extra bit in the 2n bits of a product supplied from minor product and major product pipelines may be disregarded. In the circuitry thus far described the extra bit is a leading ZERO before an (n−1) bit minor product. However, in repeated multiplication operations maintaining maximum bit resolution (or ("accuracy")) greatly increases the number of bits in the digital product. To retain all product bits in a series of digital multiplications undesirably slows the later multiplications, and so it is a usual practice to retain only n bits of a product for use in further computation. This procedure is one type of rounding off known as "round-down". If the correct n bits of the product are retained, the discarding of the other bits often will be at most a minor detriment to accuracy since the multiplicands are of limited accuracy themselves.

Consider data formats in which the word comprises n bits and f of the less significant bits describe a binary fraction. This is referred to herein as the (n,f) format. Thus, if $a_{n-1} a_{n-2} \ldots a_0$ is a bit pattern representing a number in (n,f) format, then the number represented by this bit pattern is:

$$2^{-f}\left[-a_{n-1}2^{n-1} + \sum_{i=0}^{f-2} a_i 2^i\right]. \quad (1)$$

When two such numbers are multiplied, a (2n−1) bit product $b_{2n-2} b_{2n-3} \ldots b_0$ results. If the correct answer to the multiplication is also to be expressed in (n,f) format, then bits $b_{n+f-1} \ldots b_f$ must be selected. For instance, if the data involved is purely fractional -- i.e. the most significant bit is a sign bit and f=(n−1) in the (n,f) format -- then the high-order major-product bits must be retained. However, if data is in a purely integer format -- i.e. f=0 in the (n,f) format -- then the low order n bits must be retained, assuming no overflow. The product is the (n−1) most significant bits of PRODLO and the least significant bit of PRODHI. For other (n,f) formats, where f is between ZERO and n, intermediate groups of n bits have to be retained in the result to maintain the same (n,f) format or nearly maintain that format where overflow would otherwise occur. To accurately multiply numbers in different (n,f) formats, one wishes to have the capability of selecting different sets of bits from the full-precision product during rounddown.

Figure 5:
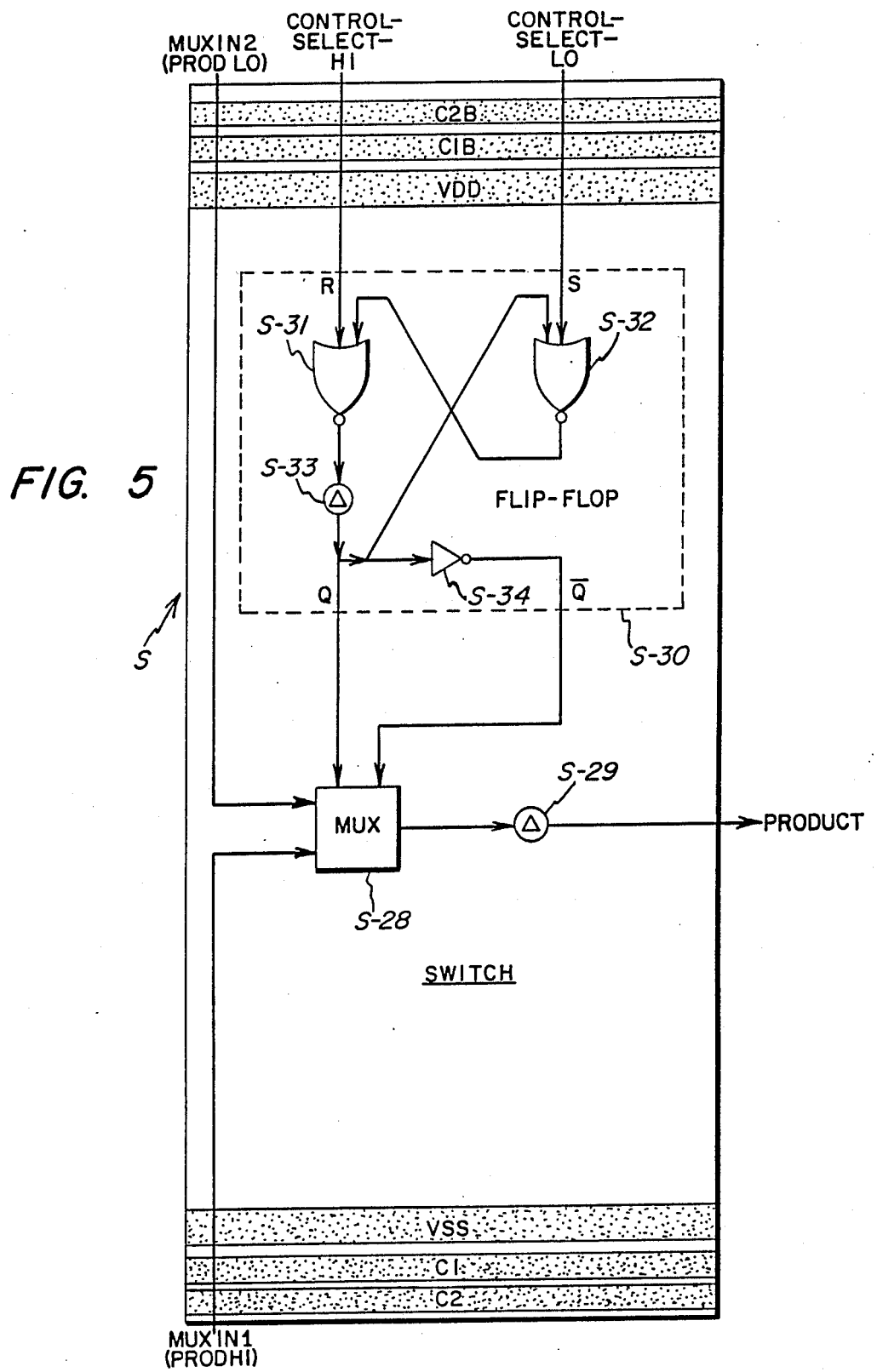
FIG. 5 is a partially schematic diagram of a switch cell for selecting particular product bits that may be used together from the FIG. 1 serial-parallel multiplier or its like in an aspect of the invention for performing a shift left operation, or for performing a shift right operation.

FIG. 5 shows a SWITCH cell S that can be used for selecting any group of n consecutive bits from the PRODHI and PRODLO bit streams. SWITCH cell S can also be employed to shift data left or right as will be explained further on. When SWITCH cell S is used to select a group of n consecutive bits from the PRODHI and PRODLO bitstreams these bitstreams are supplied to the MUXIN1 and MUXIN2 interfaces of SWITCH cell S via respective jumper connections (not shown). Additionally, SWITCH cell S receives two control signals, CONTROL-SELECT-HI and CONTROL-SELECT-LO, which operate to select appropriate portions from the PRODLO and PRODHI bit streams.

SWITCH cell S includes flip-flop S-30 which receives the aforementioned CONTROL-SELECT-LO and CONTROL-SELECT-HI signals. Flip-flop S-30 produces outputs shown as Q and $\overline{Q}$ both of which are supplied to control the selection carried out by multiplexer S-28. In particular, MUX unit S-28 receives both the PRODHI and PRODLO bit streams via terminals MUXIN1 and MUXIN2 respectively and selects to the input ports of a clocked unit-delay element S-29 portions of those bit streams. The output port of clocked unit-delay element S-29 supplies the delayed selected portions as the PRODUCT output signal from SWITCH cell S.

The preferred construction of flip-flop S-30 is more particularly shown in FIG. 5 as being one in which NOR gates S-31 and S-32 are connected in a mutual feedback arrangement with clocked delay latch S-33 being present in the output signal path of NOR gate S-31 prior to the feedback connection to NOR gate S-32. This arrangement avoids uncertainty of flip-flop condition which otherwise tends to occur when set and reset signals are applied during the same clock interval. Flip-flop S-30 invariably responds to application of a reset signal thereto to be reset the following clock cycle. Flip-flop S-30 conditionally responds to application of a set signal thereto to be set the following clock cycle, the condition being that no reset signal is applied the same clock cycle as set signal. The output Q from clocked unit-delay element S-33 is operated on by inverter S-34 to produce complemented output $\overline{Q}$ Like most control signals on a bit-serial chip, the CONTROL-SELECT-HI and CONTROL-SELECT-LO signals are high during just one bit of the word time. The CONTROL-SELECT-HI and CONTROL-SELECT-LO signals are generally produced on a bit-serial chip by a central controller which connects the appropriately timed control signal to each control type circuit.

If the CONTROL-SELECT-LO line is asserted, then Q goes low in the next cycle. If the CONTROL-SELECT-HI line is asserted, then Q goes high in the next cycle. If both the CONTROL-SELECT-LO and CONTROL-SELECT-HI lines are not asserted (that is, low), then the previous value is retained. If both the CONTROL-SELECT-LO and CONTROL-SELECT-HI lines are asserted, then CONTROL-SELECT-LO predominates and the output Q goes low in the next cycle. It can be seen, therefore, that if the CONTROL-SELECT-LO line goes high, then the PRODLO input is selected during the next clock cycle and will be passed to the output PRODUCT line one cycle later. The subsequent output follows the PRODLO output. When CONTROL-SELECT-HI is asserted, the output switches back following the PRODHI input.

An important aspect of SWITCH cell S is its ability to select successive n-bit segments from the full product generated by preceding multiplier apparatus. The PRODHI and PRODLO signals are supplied from the multiplier apparatus to a multiplexer unit S-28 in the SWITCH cell S. The low-order word of a full product precedes its high-order word by n clock cycles for a multiplier A word length of n bits. Thus, the product output generally appears as follows:

Low-order word: ... $d_1 d_0, c_{n-1} ... c_0, b_{n-1} ... b_0,$
High-order word: ... $c_{n+1} c_n, b_{2n-1} ... b_n, a_{2n-1} .. . a_n,$ Commas indicate word boundaries, above.

To extract bits f to $n+f-1$ (where $n>f\geq 0$) from the double stream, the high value of CONTROL-SELECT-HI should arrive with the most significant bit and the CONTROL-SELECT-LO signal should arrive f cycles later. Thus, by the addition of SWITCH cell S, it is possible to select any bit field starting at bit f where $n>f\geq 0$.

Data formats of the form (n,f) with $f<0$ and $f\geq n$ may also be handled by the system shown in FIG. 1 augmented by a properly connected SWITCH cell S, despite the binary point lying outside the confines of the product. Consider the respective connections of SWITCH cell S to implement a shift right operation and to implement a shift left operation. The product is considered abstractly as being a word extending to infinity in either direction, extended to the right (low order end) by ZEROs and to the left (high order end) by sign extension. If $f<0$, then bits f to $n+f-1$ can be obtained from a left shift of the low order word, and if $f\geq n$, then the bits can be obtained from a right shift of the high order word.

In a shift left operation, the most significant bits of the word are discarded and ZEROS are moved into the least significant bit positions. In a bit-serial data stream, these ZEROS overwrite the most significant high order bits of the previous data word and the control signal is delayed to redefine word boundaries correctly. For instance, a two-bit shift left in an n-bit word produces the following results in terms of input (first row) and output (second row) bit streams.

... $c_1 c_0, b_{n-1} b_{n-2} b_{n-3} ... b_1 b_0, a_{n-1} a_{n-2} a_{n-3} .$ .

... $c_1 c_0\ 0\ 0, b_{n-3} ... b_1 b_0\ 0\ 0, a_{n-3} ...$

The notation above represents a snapshot of a bit-serial pipeline moving from left to right. The actual order that bits are produced by a shift left operator is as they are read from right to left. Again, commas denote word boundaries. Note that the word boundaries are redefined as between the input and output bit streams. By connecting the MUXIN2 input of SWITCH cell S to receive PRODLO and the MUXIN1 input of SWITCH cell S to receive PRODHI, by timing the CONTROL-SELECT-LO pulse to arrive with the most significant bit of the PRODLO input to SWITCH cell S, and by timing the CONTROL-SELECT-HI pulse m cycles previously, a shift left of PRODLO by m bits results.

In a shift right operation, the leading bits of a word are discarded and the sign bit is repeated. In a bit-serial stream, the repeated sign bits from one sample overwrite the discarded leading bits from the next sample. For instance, a two-bit shift right in an n-bit word produces the following results as specified in terms of input (first row) and output (second row) bit streams:

... $c_2 c_1 c_0, b_{n-1} b_{n-2} ... b_2 b_1 b_0, a_{n-1} ...$
... $c_2, b_{n-1} b_{n-1} b_{n-1} b_{n-2} ... b_2, a_{n-1} a_{n-1} a_{n-1} .$
..

The notation above represents a snapshot of a bit-serial pipeline moving from left to right. The actual order that bits are produced by a shift right operator is as they are read from right to left. Again, commas denote word boundaries, and the word boundaries are redefined as between the input and output bit streams. By switching between the input stream and the value of the previous sign bit, one achieves a shift right. More specifically, if the output PRODUCT is fed back to MUXIN2 of SWITCH cell S by a jumper connection not shown, rather than MUXIN2 being connected to receive PRODLO, and if PRODHI bitstream is applied to MUXIN1 input of SWITCH cell S, then the two inputs to the SWITCH cell are PRODHI and the previously selected value. If the ONE pulse of the CONTROL-SELECT-LO line is timed to coincide with the most significant bit of PRODHI and the ONE pulse of the CONTROL-SELECT-HI line arrives m cycles later, then a shift right of PRODHI by m bits results.

The multiplier described above may readily be varied by changing its length. This is particularly readily done in the context of a silicon compiler because of the uniform and modular layout of the multiplier particularly the multiplier slice cell MULTXBIT. Additionally, by properly delaying an operand B having n bits, a desired k multiplicand bits may be selected from the full length operand B. The CONTROL-LATCH signal should go high at the moment the desired bits are in place at the input ports of the icand register. In this configuration, the first bit of the multiplier operand A should be timed to be applied to AND gates x-03 during the first bit interval the contents of the icand register are applied to the AND gates x-03. With multiplier slice cells x as shown in FIG. 3 this is accomplished by synchronizing CONTROL signal being ONE with the most significant (sign) bit of multiplier signal A.

Multiplication with an n-bit multiplicand B having $(n-k+1)$ more significant bits that are sign bit or extensions thereof, can be done with only k multiplier slices. This is done by latching the k least significant bits of multiplicand B, including only a single sign bit, into the icand register. The sign bit extension circuitry in the multiplier apparatus generates a full $2n-1$ bit product. There is no binary point shift associated with using only the k multiplier slices in this way.

Multiplication with an n-bit multiplicand B invariably having n-k ZEROs in its less significant bit places can be done with only k multiplier slices by latching only the more significant bits into the icand register, for example. A SWITCH cell S at the output of the multiplier apparatus can be connected to provide a shift left by $(n-k)$ bits to restore the binary point.

Multiplication both truncating leading, less-significant ZEROs in the multiplicand and eliminating sign bit extensions in the multiplicand as well are possible.

While the present multiplier has been described principally for variable-by-variable multiplication, it is also applicable to constant-by-variable multiplication. The essential simplification in this situation is that the value stored in the B latch, instead of being variable, is hardwired with a constant. Using this approach, it is possible to make the multipliers with only the number of multiplier slice cells required to span the multiplicand bits extending from the least significant ONE to the least significant sign bit or extension thereof, inclusive. That is, a string of leading less significant ZEROs may be suppressed in the multiplicand, a string of trailing ZEROs may be replaced by a single ZERO in the multiplicand, and a string of trailing ONEs may be replaced by a single ONE in the multiplicand. Thus, for smaller or low-precision constants, a serial-parallel multiplier in accordance with the invention can produce a major reduction in circuit layout size.

Figure 6:
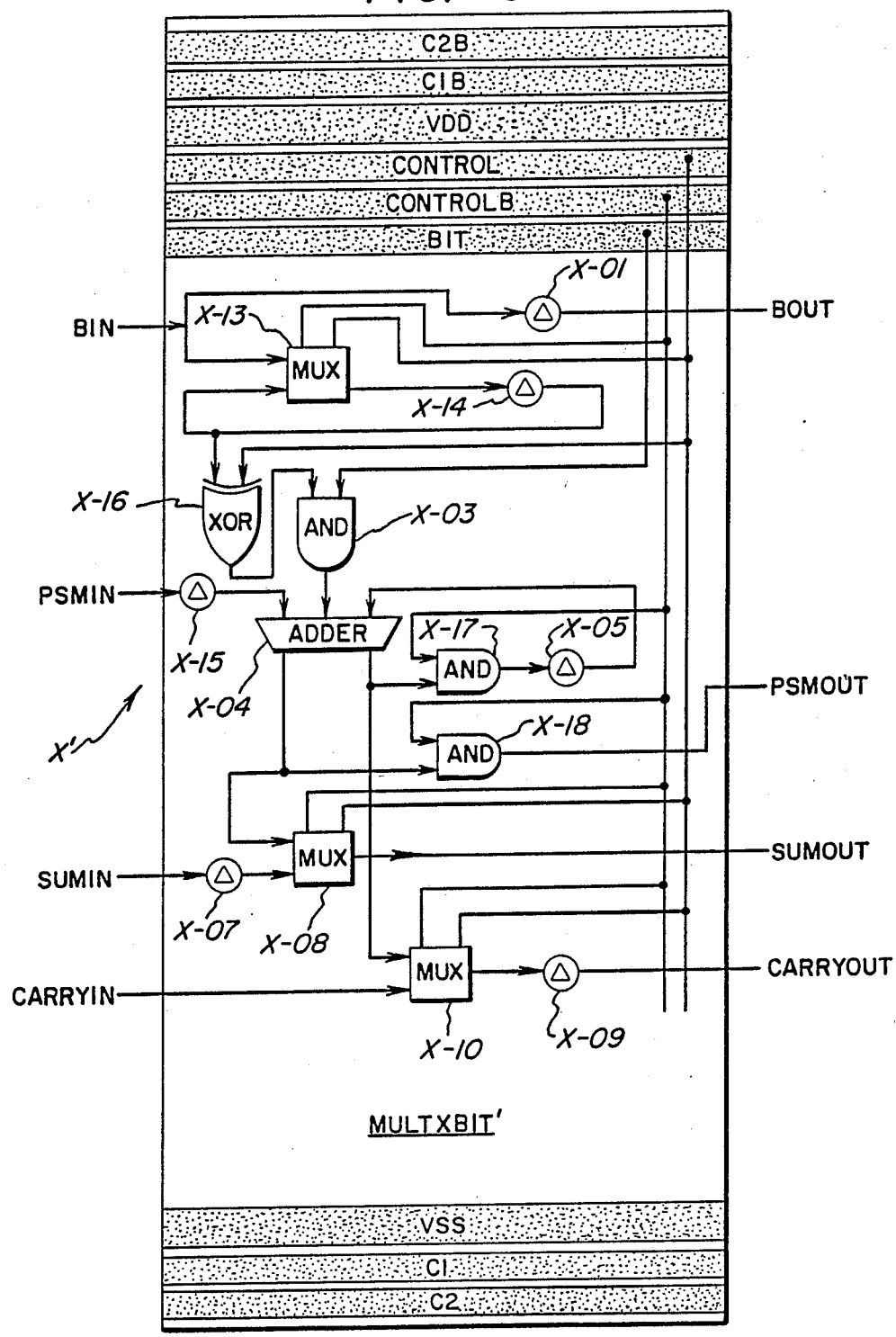
FIG. 6 is a partially schematic diagram illustrating an alternative construction of a multiplier slice cell for a serial-parallel multiplier in accordance with an aspect of the invention.

FIG. 6 shows a MULTXBIT' multiplier slice cell which differs from the MULTXBIT multiplier slice cell of FIG. 3 in that the clocked unit-delay element x-06 in the PSMOUT line is replaced by direct connection and a clocked unitdelay element X-15 is inserted into the PSMIN line to adder x-04.

Figure 7:
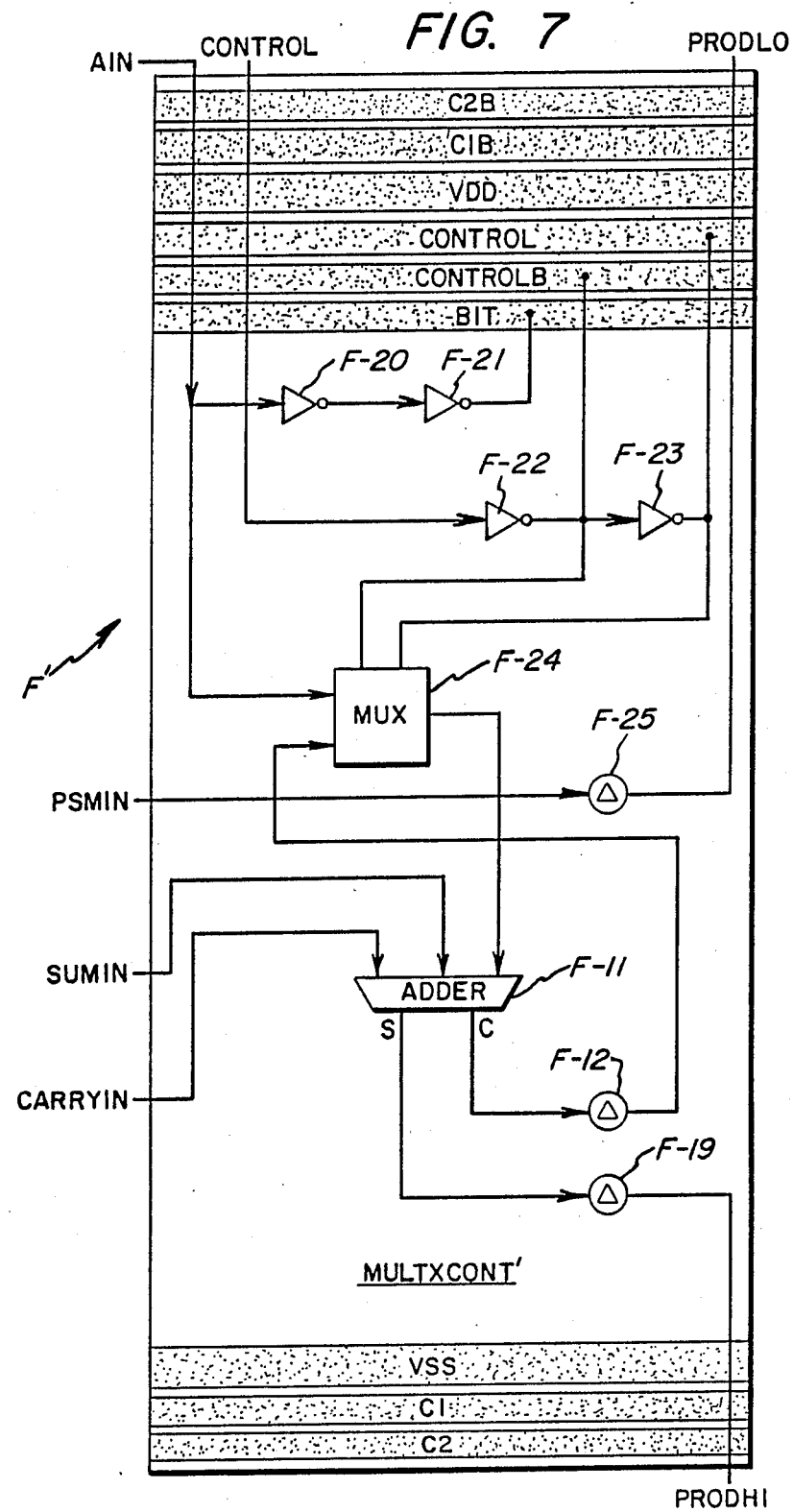
FIG. 7 is a partially schematic diagram illustrating an alternative construction of a control cell that is used together with multiplier slice cells per FIG. 6 in constructing an alternative form of serial-parallel multiplier in accordance with the invention.

FIG. 7 shows a control cell MULTXCONT' that is used together with MULTXBIT' multiplier slice cells per FIG. 6 in constructing an alternative form of serial-parallel multiplier in accordance with the invention. MULTXCONT' control cell of FIG. 7 differs from MULTXCONT control cell of FIG. 4 in that a clocked unit-delay element F-25 is introduced between the PSMIN input and PRODLO output interfaces, to provide respective delay between the minor product and major product that allows SWITCH cell S to be used after the modified control cell in substantially the same way as previously described. Variants of MULTXCONT' control cell wherein delay elements F-19 and F-25 are replaced by respective direct connections are also possible, with data latching being carried out in subsequent circuitry, such as the clocked unit-delay element S-29 of SWITCH cell S per FIG. 5.

While the invention has been described in detail herein in accord with certain preferred embodiments thereof, many modifications and changes therein may be effected by those skilled in the art --e.g. modifications to allow multiplication of non-signed numbers and modifications to allow control signals to change condition during the initial rather than the last bit of the multiplier A. Accordingly, it is intended by the appended claims to cover all such modifications and changes as fall within the true spirit and scope of the invention.

In these claims the word "said" is used to indicate antecedence, rather than the "the".

The invention claimed is:

1. A serial-parallel digital multiplier comprising:
    means for supplying k bits of a multiplicand signal in parallel during an earlier of two consecutive successions of clock intervals, each n in number, k being an integer greater than one and n being a positive integer at least as large as k;
    a battery of two-input port AND gates, k in number, having respective first input ports, respective second input ports, and respective output ports;
    means for applying to the first input ports of said battery of AND gates, during each of said earlier succession of clock intervals except its last clock interval, k bits corresponding to respective bits of said multiplicand signal;
    means for applying to the first input ports of said battery of AND gates during the last of said earlier succession of clock intervals, k bits that are the one's complement of respective bits of said multiplicand signal;
    means for supplying to the second input ports of said battery of AND gates n successive bits of a bit-serial multiplier signal of bit length n as sequentially received during respective ones of said earlier succession of clock intervals, whereby the partial products of each of these bits with the signal applied to the first ports of said AND gates are successively generated at the output ports of said battery of AND gates during respective ones of said earlier succession of clock intervals;
    a parallel adder, composed of k bit slices, for adding each successively generated partial product as a first addend to respective second and third addends to generate for each of said k bit slices a respective sum bit and a respective carry bit;
    means for supplying during said earlier succession of clock signals a minor product signal obtained from the successive sum bits for the least significant of said k bit slices of said parallel adder;
    means for delaying by one clock interval the sum bits generated by the parallel adder for the other, more significant ones of its k bit slices, to generate except for sign bit each successive said second addend for said parallel adder during said earlier succession of clock intervals;
    means for applying during the last of said earlier succession of clock intervals a ZERO as the sign bit of said second addend;
    means for applying during all other clock intervals in said earlier succession except the first, the sum bit generated in the most significant bit slice of said parallel adder and delayed by one clock interval as the sign bit of said second addend;
    means for delaying by one clock interval the carry bits generated by the parallel adder to generate each successive said third addend for said parallel adder during said earlier succession of clock intervals;
    first parallel-to-serial converting means for converting the sum bits supplied from said k bit slices of said parallel adder during the last of said earlier succession of clock intervals to appear serially during that clock interval and the ensuing next (k−1) clock intervals in a later of said two consecutive successions of clock intervals, to be followed by a ZERO the next clock interval of said later succession, to be followed by a repeat of the most significant of the sum bits for each remaining one of the n clock intervals of said later succession;
    second parallel-to-serial converting means for converting the carry bits supplied from the k bit slices of said parallel adder during the last of said earlier succession of clock intervals to appear serially the ensuing next k clock intervals in said later succession, to be followed by a repeat of the most significant of the carry bits for any remaining one of the n clock intervals of said later succession; and
    a serial adder for adding the sum bits supplied serially by said first parallel-to-serial converting means, the carry bits supplied serially by said second parallel-to-serial converting means, and the sign bit of said bit-serial multiplier signal during the last of said ensuing next k clock intervals of said later succession, thereby to generate a major product signal.

2. A serial-parallel digital multiplier as set forth in claim 1 wherein k is smaller than n.

3. A serial-parallel digital multiplier as set forth in claim 1 wherein said means for supplying k bits of a multiplicand signal in parallel comprise:
    serial-to-parallel converting means for sequentially receiving the successive bits of said multiplicand signal in bit-serial format during k consecutive clock intervals the last of which k consecutive clock intervals precedes the initial clock interval of the earlier of said two consecutive successions of clock intervals, each n in number, and supplying those k bits in parallel during the last clock interval of said k consecutive clock intervals; and input latch means to which those k bits in parallel are supplied for storage, to be supplied therefrom throughout said two consecutive successions of clock intervals, each n in number.

4. A serial-parallel digital multiplier as set forth in claim 3 wherein said means for supplying k bits of a multiplicand signal in parallel for a succession of clock cycles, n in number, supplies k bits of successive multiplicand signals in respective ones of an uninterrupted series of n clock cycles;

and wherein said means for supplying successive bits of a bit-serial multiplier supply successive bits of successive multiplier signals during ones of said uninterrupted series of successions of n clock cycles.

5. A serial-parallel multiplier as set forth in claim 3 wherein said means for supplying k bits of a multiplicand signal in parallel provides those said k bits on a constant basis for successive multiplications with respective ones of successively supplied bit-serial multiplier signals.

6. A serial-parallel digital multiplier as set forth in claim 1 wherein said means for supplying k bits of a multiplicand signal in parallel provides those said k bits on a constant basis for successive multiplications with respective ones of successively supplied bit-serial multiplier signals.

7. A serial-parallel digital multiplier as set forth in claim 1 including:

means for staggering the serially generated said major and minor products so said minor product appears serially in the clock intervals immediately preceding the clock intervals in which said major product associated therewith appears.

8. A serial-parallel digital multiplier as set forth in claim 7 further comprising:

a time-division multiplex switch for selecting n successive-in-time bits from the staggered-in-time said major and minor products.

9. A serial-parallel digital multiplier as set forth in claim 8 wherein said means for supplying k bits of a multiplicand signal in parallel comprise:

serial-to-parallel converting means for sequentially receiving the successive bits of said multiplicand signal in bit-serial format during k consecutive clock intervals the last of which k consecutive clock intervals precedes the initial clock interval of the earlier of said two consecutive successions of clock intervals, each n in number, and supplying those k bits in parallel during the last clock interval of said k consecutive clock intervals; and input latch means to which those k bits in parallel are supplied for storage, to be supplied therefrom throughout said two consecutive successions of clock intervals, each n in number.

10. A serial-parallel digital multiplier as set forth in claim 9 wherein said means for supplying k bits of a multiplicand signal in parallel for a succession of clock cycles, n in number, supplies k bits of successive multiplicand signals in ones of an uninterrupted series of n clock cycles; and wherein said means for supplying successive bits of a bit-serial multiplier supply successive bits of successive multiplier signals during ones of said uninterrupted series of successions of n clock cycles.

11. A serial-parallel digital multiplier as set forth in claim 8 wherein said means for supplying k bits of a multiplicand signal in parallel provides those said k bits on a constant basis for successive multiplications with respective ones of successively supplied bit-serial multiplier signals.

12. A serial-parallel multiplier comprising:

a battery of two-input-port AND gates, k in number having respective first input ports, having respective second input ports, and having respective output ports, k being an integer greater than one;

means for supplying k bits of a multiplicand signal in parallel to respective ones of the first input ports of said battery of two-input-port AND gates during an earlier of two consecutive successions of clock cycles, each n in number, n being a positive integer at least as large as k;

means for supplying to the second input ports of said battery of AND gates successive bits of a serial multiplier signal of bit-length n as sequentially received in order of increasing bit significance during respective ones of said earlier succession of clock cycles, n in number, whereby the partial products of each of those bits with the multiplicand signal are successively generated at the output ports of said battery of AND gates during respective ones of said earlier succession of clock intervals;

a parallel adder, composed of k bit slices, for adding each successive partial product as a first addend to respective second and third addends to generate for each of said k bit slices a respective sum bit and a respective carry bit;

means for supplying a minor product signal obtained from the successive sum bits for the least significant of the k bit slices of said parallel adder;

means for delaying by one clock interval the sum bits generated by the parallel adder for the other, more significant ones of its k bit slices to generate the less significant bits of said second addend for said parallel adder during said earlier succession of clock intervals;

means for applying a ZERO as the most significant bit of each successive second addend;

means for delaying by one clock interval the carry bits generated by the parallel adder to generate each successive said third addend for said parallel adder during said earlier succession of clock intervals;

first parallel-to-serial converting means for converting the sum bit supplied from the k bit slices of said parallel adder during the last of said earlier succession of clock intervals to appear serially during that clock interval and the ensuing next (k−1) clock intervals of a later of said two consecutive successions of clock intervals to be followed by a ZERO each remaining one of the n clock intervals of said later succession;

second parallel-to-serial converting means for converting the carry bits supplied from the k bit slices of said parallel adder during the last of said earlier succession of clock intervals to appear serially the ensuing next k clock intervals of said later succession, to be followed by a ZERO for any remaining one of the n clock intervals of said later succession; and a serial adder for adding the sum bits supplied serially by said first parallel-to-serial converting means, and the carry bits supplied serially by said second parallel-to-serial converting means, thereby to generate a major product signal.

13. A serial-parallel digital multiplier as set forth in claim 12 wherein k is smaller than n.

14. A serial-parallel multiplier as set forth in claim 12 wherein said means for supplying k bits of a multiplicand signal in parallel comprises:
serial-to-parallel converting means for sequentially receiving the successive bits of said multiplicand signal in bit-serial format during k consecutive clock intervals the last of which clock intervals precedes the initial clock interval of said earlier succession of clock intervals, and supplying those k bits in parallel during the last clock interval of said k consecutive clock intervals; and
input latch means to which these k bits in parallel are supplied for storage, to be supplied therefrom throughout said earlier succession of clock intervals.

15. A serial-parallel multiplier as set forth in claim 14 wherein said means for supplying k bits of a multiplicand signal in parallel supplies k bits of successive multiplicand signals in ones of an uninterrupted series of n clock cycles; and wherein said means for supplying successive bits of a bit-serial multiplier supply successive bits of successive multiplier signals during ones of said uninterrupted series of successions of n clock cycles.

16. A serial-parallel multiplier as set forth in claim 12 wherein said means for supplying k bits of a multiplicand signal in parallel provides those said k bits on a constant basis for successive multiplications with respective ones of successively supplied bit-serial multiplier signals.

17. A serial-parallel digital multiplier as set forth in claim 12 wherein said means for supplying a minor product signal includes:
means for staggering in time serially generated said major and minor products so said minor product appears serially in the clock intervals immediately preceding the clock intervals in which said major product associated therewith appears.

18. A serial-parallel digital multiplier as set forth in claim 17 further comprising:
a time-division multiplex switch for selecting n successive-in-time bits from the staggered-in-time said major and minor products.

19. A serial-parallel multiplier as set forth in claim 18 wherein said means for supplying k bits of a multiplicand signal in parallel comprises:
serial-to-parallel converting means for sequentially receiving the successive bits of said multiplicand signal in bit-serial format during k consecutive clock intervals the last of which clock intervals precedes the initial clock interval of said earlier succession of clock intervals, and supplying those k bits in parallel during the last clock interval of said k consecutive clock intervals; and
input latch means to which these k bits in parallel are supplied for storage, to be supplied therefrom throughout said earlier succession of clock intervals.

20. A serial-parallel multiplier as set forth in claim 19 wherein said means for supplying k bits of a multiplicand signal in parallel supplies k bits of successive multiplicand signals in ones of an uninterrupted series of n clock cycles; and wherein said means for supplying successive bits of a bit-serial multiplier supply successive bits of successive multiplier signals during ones of said uninterrupted series of successions of n clock cycles.

21. A cell module for a serial-parallel multiplier, said cell module comprising:
an input latch responsive to a control signal switching from a first state thereof to a second state thereof for storing a next occurring single bit of a first to two serial binary operands;
means for deriving a multiplicand bit from the single bit stored in said input latch;
means for multiplying said multiplicand bit by each successive bit of a second of said serial binary operands during a respective clock interval to generate a respective single-bit products;
adder means for adding together during each said clock interval a previous carry output signal from said adder means, the currently generated said single-bit product and a partial sum input bit to said cell module, thereby to generate a current carry bit and a current sum bit;
first unit-delay means for storing said current sum bit for one clock interval, thereby to provide a delayed sum bit selectively supplied from said cell module as a partial sum output bit;
second unit-delay means for storing a single-bit input sum signal supplied to said cell module for one clock interval, thereby to provide a delayed input sum signal;
first selector means, for selecting as a sum output signal from said cell module either said sum bit or said delayed input sum signal;
third unit-delay means for storing a single bit for one clock interval as a carry output signal; and
second selector means, for selecting to said third unit-delay means for storage, said current carry input signal bit to said cell module.

22. A cell module as set forth in claim 21 wherein said means for deriving a multiplicand bit from the single bit stored in said input latch includes:
means for generating said multiplicand bit as the equal of said stored single bit stored in said latch or its complement in response to the first and second states respectively of said control signal.

23. A plurality of cell modules as set forth in claim 21, k in number, respectively identified by consecutive ordinal numbers first through $k^{th}$ and provided bits of said first binary operand having significance that decreases with increasing ordinal number, in a serial-parallel multiplier that further comprises:
means for generating said control signal so as to be in its first state during every bit of said second binary operand except its most significant bit, its sign bit, and to be in its second state during the sign bit of said second binary operand;
means for applying the partial sum output bit of each of said first through $k^{th}$ cell modules except the $k^{th}$ as the partial sum input bit of the cell module identified by the next higher ordinal number, the successive values of partial sum output bit from said $k^{th}$ cell module forming a minor product signal;
means for applying the carry output signal bit of each of said first through $k^{th}$ cell modules except the $k^{th}$ as the carry input signal bit of the cell module identified by the next higher ordinal number;
means for applying the sum output signal bit of each of said first through $k^{th}$ cell modules except the $k^{th}$ as the sum input signal bit of the cell module identified by the next higher ordinal number;

means for applying sign extension bits as the partial sum input bit, the carry input signal bit, and the sum input signal bit of said first cell module;

further adder means for adding together, during each clock interval of a second set of clock intervals k in number immediately following the first set of clock intervals, the sum output signal of said $k^{th}$ cell module, the carry output signal of said $k^{th}$ cell module, and a further signal to generate its own sum output bits;

means responsive to said control signal being in its first state for supplying to said further adder means as said further signal thereto its own carry bits delayed by one clock interval; and means responsive to said control signal being in its second state for supplying the sign bit of said second operand to said further adder means as said further signal thereto.

24. A cell module for a serial-parallel multiplier, said cell module comprising:

an input latch responsive to a control signal switching from a first state thereof to a second state thereof for storing a next occurring single bit of a first of two serial binary operands;

means for deriving a multiplicand bit from the single bit stored in said input latch;

means for multiplying said multiplicand bit by each successive bit of a second of said serial binary operands during a respective clock interval to generate a respective single-bit product;

first unit-delay means for storing a partial sum input bit to said cell module for one clock interval, thereby to provide a delayed partial sum input bit;

adder means for adding together during each said clock interval its own previous carry output signal, the currently generated aid single-bit product and said delayed partial sum input bit, thereby to generate a current carry bit and a current sum bit;

second unit-delay means for storing a single-bit input sum signal supplied to said cell module for one clock interval, thereby to provide a delayed input sum signal;

means for selecting as a sum output signal from said cell module either said sum bit or said delayed input sum signal;

third unit-delay means for storing a single-bit for one clock interval as a carry output signal; and means for selecting to said third unit-delay means for storage, said current carry bit or carry input signal bit to said cell module.

25. A cell module as set forth in claim 24 wherein said means for deriving a multiplicand bit from the single bit stored in said input latch includes:

means for generating said multiplicand bit as the equal of said stored single bit stored in said latch or its complement in response to the first and second states respectively of said control signal.

26. A plurality of cell modules as set forth in claim 24, k in number, respectively identified by consecutive ordinal numbers first through $k^{th}$ and provided bits of said first binary operand having significance that decreases with increasing ordinal number, in a serial-parallel multiplier that further comprises:

means for generating said control signal so as to be in its first state during every bit of said secondary binary operand except its most significant bit, its sign bit, and to be in its second state during the sign bit of said second binary operand;

means for applying the current sum bit of each of said first through $k^{th}$ cell modules except the $k^{th}$ as the partial sum input bit of the cell module identified by the next higher ordinal number, the successive values of current sum bit from said $k^{th}$ cell module forming a minor product signal;

means for applying the carry output signal of each of said first through $k^{th}$ cell modules except the $k^{th}$ as the carry input signal bit of the cell module identified by the next higher ordinal number;

means for applying the sum output signal of each of said first through $k^{th}$ cell modules except the $k^{th}$ as the sum input signal bit of the cell module identified by the next higher ordinal number;

means for applying signal extension bits as the partial sum input bit, the carry input signal bit, and the sum input signal bit of said first cell module;

further adder means for adding together, during each clock interval of a second set of clock intervals k in number immediately following the first set of clock intervals, the sum output signal of said $k^{th}$ cell module, the carry output signal of said $k^{th}$ cell module, and a further signal to generate its own sum output bits;

means responsive to said control signal being in its first state for supplying to said further adder means as said further signal thereto its own carry bits delayed by one clock interval; and means responsive to said control signal being in its second state for supplying the sign bit of said second operand to said further adder means as said further signal thereto.

27. A combination comprising:

a bit-serial multiplier having a first input port for receiving k bits of a bit-serial multiplicand signal having words of n bits, k being an integer greater than one and n being an integer at least as large as k, having a second input port for receiving a bit-serial multiplier signal having words of n bits, having a first output port for supplying a bit-serial minor product signal having words of n bits and having a second output port for supplying a bit-serial major product signal having words of k bits, each word of said major product following in time each word of said minor product, the bits of said minor and major products being supplied in order of increasing significance with passage of time; and a time-division multiplexer for selecting as the initial portion of each output signal word an integral number g of the more significant bits of said minor product signal, g being an integer between zero and $(n-1)$ inclusive, and for selecting as the final bits of each output signal word an integral number n at least one of the less significant bits of said major product signal.

28. The combination of claim 27 wherein the sum of g and h is n.

29. The combination of claim 28 wherein k and n are equal.

30. A method for performing serial-parallel multiplication in electronic apparatus, said method comprising the steps of:

supplying a serial digital multiplier signal having words the n bits of each of which words occur during respective ones of n successive clock intervals with the successive bits in each word increasing in significance, n being an integer greater than one;

supplying k parallel bits representative of a digital multiplicand signal during the n bits of each word of said serial digital multiplier signal, k being an integer greater than one and no larger than n;

successively multiplying the k parallel bits representative of a digital multiplicand signal in a respective AND gate by each bit of said digital multiplier signal to generate respective partial products k bits in width;

accumulating a partial sum in a parallel adder composed of bit slices, as said partial products are generated during said n successive clock intervals, by shifting the previous partial sum, if any, one bit place towards greater significance;

providing in uncombined form a respective sum bit and a respective carry bit from each bit-slice of said parallel adder;

extracting the least significant sum bit of said partial sum each of said n successive clock intervals to generate a minor product serial output signal;

applying the more significant of said sum bits from said parallel adder during the last of said n successive clock intervals to a first parallel-to-serial converter;

applying the carry bits from said parallel adder during the last of said n successive clock intervals to a second parallel-to-serial converter;

supplying, to a serial adder, said sum bits sequentially from said first parallel-to-serial converter and said carry bits sequentially from said second parallel-to-serial converter with one clock interval relative delay, thereby to generate from said serial adder a major product serial output signal.

31. The method of claim 30 wherein said digital multiplier signal is bit-serial in nature and provides a two's complement description of a number, wherein said k parallel bits representative of a multiplicand are used directly as that multiplicand for every one of said n successive clock intervals except the last, wherein said k parallel bits are complemented to be used as multiplicand the last of said n successive clock intervals, and wherein the most significant bit of said multiplier is supplied as a carry to said serial adder during the last of said n successive clock intervals.

* * * * *